3,017,350
EMULSION-BASE DRILLING FLUIDS
Paul W. Fischer, Whittier, Calif., assignor to Union Oil Company of California, Los Angeles, Calif., a corporation of California
No Drawing. Filed Jan. 18, 1954, Ser. No. 404,788
10 Claims. (Cl. 252—8.5)

This invention relates to drilling fluids such as are used in drilling oil and gas wells, and in particular concerns drilling fluids of the emulsion-base type.

In drilling oil and gas wells by means of rotary drilling tools, a fluid body known as a drilling fluid or mud is circulated downwardly through the drill stem, through the bit and against the working face of the hole, and thence upwardly to the surface through the annular space between the drill stem and the walls of the bore hole. Such fluid body serves to cool and lubricate the drill bit, to carry cuttings to the surface, to apply a hydrostatic pressure against the walls of the bore, etc. In general, a drilling fluid essentially comprises a liquid suspending medium having suspended or dispersed therein a solid capable of imparting thereto the necessary characteristics of viscosity, thixotropicity, gel strength, infiltrability, etc. Substantially all drilling fluids fall within one of three types depending upon the nature or identity of the liquid suspending medium, i.e., a drilling fluid is termed "water-base" when the liquid suspending medium is water or an aqueous solution, "oil-base" when the suspending medium is mineral oil, or "emulsion-base" when the suspending medium is a water-in-oil or an oil-in-water emulsion.

While all drilling fluids must comprise a liquid suspending medium and one or more solids capable of imparting thereto the afore-mentioned physical properties, the emulsion-base fluids require a third component by way of an agent capable of maintaining the oil and water together in the form of an emulsion. In some instances such emulsifying agent may also serve to maintain solid components of the composition stably dispersed in the emulsified suspending medium. Ideally, the emulsifying and/or dispersing agent should be capable of forming an emulsion of water and oil which is highly stable, even in the presence of electrolytes; it should help to maintain solid components of the fluid uniformly dispersed in the liquid phase; it should not unduly increase the viscosity of the composition; it should not interfere with other components of the composition, e.g., viscosity modifiers, gel strength improvement agents, wall-building agents, weighting materials, etc.; and it should be as inexpensive as possible.

I have now found that the above requirements are to a large extent met by a product obtained by reacting an alkali-metal alkali with a material which is herein referred to as "fatty acid still bottoms." Said material is more fully defined hereinafter, but may be described generally as the material obtained as a bottoms product when vacuum distilling the fatty acid portion of the hydrolysate obtained in the continuous high-pressure aqueous hydrolysis of animal and vegetable fats and oils. It comprises about 50–70 percent of high-boiling fatty acids having an acid number of about 150–170 mg./g., the remainder being high-boiling unsaponifiable oils, polymers, etc. In particular, I have found that emulsion-base drilling fluids comprising mineral oil, water, a clay or clay-like material which acts as a wall-building agent to impart thixotropicity and infiltrability to the fluid, an alkaline compound of an alkali-metal, and a minor proportion of the aforesaid fatty acid distillation bottoms are highly stable over a wide range of temperature and pressure conditions and possess excellent fluid loss characteristics. Such fluids are also stable towards contaminating electrolytes, are capable of being weighted to high apparent densities, and lend themselves to modification through the use of gel strength improvement agents, e.g. 0.1–3 lbs./bbl. of sodium pyrophosphate, viscosity modifiers, etc. The alkali-metal compound and the fatty acid distillation bottoms may be employed in the form of a previously prepared reaction product or they may be incorporated into the composition as separate ingredients. Also, the clay and the emulsifying agent, together with optional components, may be combined with a part of the oil and/or water to form a concentrate composition which can be stored and shipped as such and eventually diluted with oil and/or water at the well site to form the finished drilling fluid.

The mineral oil which, in the form of an aqueous emulsion, constitutes the suspending medium in the drilling fluids provided by the invention may be crude petroleum or a distillate or residuum material. It may also comprise a mixture of oils, such as a blend of a relatively heavy oil, e.g., light tars, cracked residua, heavy extracts and the like, and a light distillate such as gas oil or diesel fuel. Blended oils of this type are usually preferred. In general, however, any of the oils commonly employed in the formulation of emulsion-base drilling fluids may be employed, and the selection of particular oils on the base of their chemical and physical characteristics is well understood by those skilled in the art. Usually, such oil will have a gravity between about 12° and about 40° API and a viscosity ranging from about 30 SUS at 100° F. to about 110 SSF at 122° F. The invention, however, is not limited to any particular type of oil or mixtures thereof.

The clay component may be any of the clays or clay-like materials commonly employed in formulating water- and emulsion-base drilling fluids. Very frequently local soils will contain sufficient clay to serve the purpose. On the other hand, high quality clays such as bentonite, montmorillonite and kaolinite are usually preferred in spite of their somewhat higher cost.

As previously stated, the emulsifying agent is the reaction product of an alkaline compound of an alkali-metal and the aforesaid fatty acid distillation bottoms. Such product may be pre-prepared by reacting the distillation bottoms with 10–60 percent by weight of the alkaline compound or, more preferably, it may be formed in situ simply by incorporating the distillation bottoms and the alkaline compound into the composition. The alkaline alkali-metal compound may be an alkali-metal hydroxide, e.g., sodium or potassium hydroxide, or a salt of an alkali-metal hydroxide and a weak base, e.g., sodium silicate, potassium carbonate, sodium carbonate, etc. Sodium hydroxide is usually preferred.

The product which is herein referred to as fatty acid distillation bottoms is obtained as a by-product from the continuous process for hydrolyzing animal and vegetable fats and oils. According to the conventional manner of carrying out such process, the feed material is pre-heated and is introduced under pressure into the lower portion of a vertical autoclave. Water is similarly preheated and introduced under pressure into the upper portion of the autoclave. The autoclave is maintained at a temperature of at least about 350° F., usually between about 365° F. and about 600° F., and at a pressure sufficient to maintain the water in the liquid state, usually between about 150 and about 1600 p.s.i. Within the autoclave, the fatty material rises upwardly through the descending body of water, and is hydrolyzed to form free fatty acids and glycerine. The latter dissolves in the water and is continuously withdrawn from the bottom of the autoclave in the form of a 15–25 percent aqueous solution known as "sweet water." Crude free fatty acids are continuously withdrawn from the top of the autoclave and are passed to a flash drum where the pressure is relieved, thereby causing dissolved water to flash off as steam. The crude acids are then passed to a flash distillation unit operated under a vacuum of about 5–25 mm. of mercury or lower and at a temperature of at least about 220° F. The overhead fraction constitutes relatively pure fatty acids, whereas the undistilled bottoms fraction constitutes the fatty acid distillation bottoms product which is employed to prepare the drilling fluids of the present invention. This product is a black molasses-like material which becomes relatively fluid upon moderate heating. Usually it boils above about 325° F. at 0.5 mm., corresponding to about 700° F. at atmospheric pressure. In addition to high-boiling fatty acids and non-saponifiable oils and/or polymers it may contain a small quantity, e.g. 2–5 percent, of metal soap as a result of the same or the corresponding oxide, e.g., zinc, calcium or magnesium oxide, having been employed to catalyze the hydrolysis reaction.

The proportions in which the foregoing essential components are employed may be varied between relatively wide limits. The emulsion which constitutes the liquid suspending medium comprises between about 10 and about 90 percent by volume of mineral oil and, conversely, between about 90 and about 10 percent by volume of water. Thus, in preparing the present composition, between about 0.1 and about 9 volumes of oil may be employed per volume of water. The clay is provided in minor proportion, usually between about 5 and about 40 percent by weight of the entire composition. The emulsifying agent is likewise provided in minor proportion, sufficient to maintain the water and oil stably emulsified. Usually such amount represents between about 0.1 and about 15 percent by weight of the entire composition. When the emulsifying agent is prepared in situ by dispersing the components thereof in the liquid phase, the fatty acid distillation bottoms product is employed in an amount representing between about 0.05 and about 10 percent by weight of the entire composition and the alkali-metal compound is employed in an amount at least chemically equivalent to the free fatty acids present in the distillation bottoms product. Usually between about 0.5 and about 20 parts of the alkali-metal compound are employed per 100 parts of the distillation bottoms product.

While no particular order of mixing need be observed in combining the essential components of the new composition, it is usually most convenient first to form the oil and water emulsion and thereafter add the clay. Thus, when forming the emulsifying agent in situ, the alkaline alkali-metal compound may be dissolved in part of the water, and the fatty acid distillation bottoms product is dispersed in a part of the water or oil. After combining the two with efficient agitation the remainder of the water and oil are stirred in to obtain the finished emulsion. The clay is then added to obtain the finished drilling fluid. When a pre-prepared emulsifying agent is employed, it may similarly be dispersed in part of the water and/or oil, and the remaining water and/or oil are thereafter added with efficient stirring. If desired, the emulsifying agent, clay and part of the oil and/or water may be combined to form a concentrate composition which can be stored and shipped as such, and can subsequently be diluted with the remaining oil and/or water to obtain the finished fluid. Also, the present fluids may be prepared from water-base drilling fluids by adding the desired quantities of oil and the emulsifying agent.

The following examples will illustrate various ways in which the principle of the invention may be applied, but are not to be construed as limiting the same. All proportions are in parts by weight.

Example I

Approximately 84 parts of fatty acid distillation bottoms and 8 parts of sodium hydroxide are stirred into 2000 parts of water. Approximately 180 parts of crude oil Santa Fe Springs, Calif.), are then stirred into the mixture, followed by 730 parts of Rogers Lake clay and 35 parts of Wyoming bentonite. After stirring for about ½ hour, the composition takes the form of a homogeneous thixotropic liquid. It has a Marsh funnel viscosity of about 40 sec., a 10-min. gel strength value of about 4 lbs./100 sq. ft., and a fluid loss value (API Code No. 29) of 5.0 ml./hr. A composition from which the distillation bottoms product is omitted has a fluid loss value of about 15 ml./hr., a viscosity of 33 sec., and zero gel strength. Upon standing for only a few minutes it completely separates into oil and water phases with the clay dropping out of suspension.

Example II

| | Parts |
|---|---|
| Water | 2000 |
| Crude oil | 180 |
| Fatty acid distillation bottoms | 60 |
| Sodium hydroxide | 3 |
| Tri-sodium pyrophosphate | 1.5 |
| Rogers Lake clay | 730 |
| Wyoming bentonite | 35 |

This composition is prepared as in Example I. The presence of the tri-sodium pyrophosphate increases the gel strength value to about 5 lbs./100 sq. ft., but the decreased amount of emulsifying agent causes the fluid loss to increase to about 10 ml./hr.

Example III

| | Parts |
|---|---|
| Water | 1000 |
| Reaction product of 10 parts of potassium hydroxide with 100 parts of fatty acid distillation bottoms | 110 |
| Wyoming bentonite | 200 |

These ingredients are combined to form a concentrate composition which can subsequently be stirred into 2000 parts of light domestic fuel oil to form a finished drilling fluid.

Example IV

| | Parts |
|---|---|
| Water | 100 |
| Diesel fuel | 600 |
| Fuel oil | 300 |
| Wyoming bentonite | 115 |
| Fatty acid distillation bottoms | 10 |
| Sodium carbonate | 2 |
| Sodium silicate | 2 |

Example V

| | Parts |
|---|---|
| Water | 500 |
| Crude oil | 500 |
| Fatty acid distillation bottoms | 40 |
| Sodium hydroxide | 1 |
| Rogers Lake clay | 400 |

Example VI

Approximately 1000 parts of diesel fuel and 50 parts of the reaction product obtained by mixing 100 parts of fatty acid distillation bottoms with 50 parts of 20% aqueous sodium hydroxide are added with stirring to an aqueous drilling fluid which has been used for drilling the first 2000 feet of hole. This latter drilling fluid contains about 0.5 lb./bbl. of tri-sodium pyrophosphate and about 0.3 lb./bbl. of quebracho and is weighted to about 72 lbs./cu. ft. with Rogers Lake clay and Wyoming bentonite. The resulting composition is a highly satisfactory emulsion-base drilling fluid suitable for continuing the hole through hydratable clay formations and into the production sands.

Other modes of applying the principle of my invention may be employed instead of those explained, change being made as regards the method or materials employed provided the steps or compositions stated by any of the following claims, or the equivalent of such stated steps or materials, be employed or obtained.

I, therefore, particularly point out and distinctly claim as my invention:

1. An emulsion-base drilling fluid comprising a liquid suspending medium comprising between about 10 and about 90 percent by volume of mineral oil and between about 90 and about 10 percent by volume of water, a clay wall-building agent suspended in said suspending medium, and an emulsifying agent comprising the product of reaction between an alkaline compound of an alkali-metal and the undistilled bottoms fraction obtained by vacuum distilling off under vacuum of about 5 to 25 mm. at a temperature of at least about 225° F., the crude fatty acid portion of the product obtained by hydrolyzing with water a material selected from the class consisting of animal and vegetable fats and oils and mixtures thereof at elevated temperatures of about 350° F. to about 600° F. and pressures between about 150 and 1600 p.s.i. to maintain the water in a liquid state, said emulsifying agent being employed in an amount sufficient to maintain said oil and water stably emulsified.

2. A composition according to claim 1 wherein said alkaline compound of an alkali-metal is an alkali-metal hydroxide.

3. A composition according to claim 1 wherein said alkaline compound of an alkali-metal is sodium hydroxide.

4. A composition according to claim 1 wherein said emulsifying agent is employed in an amount representing between about 0.1 and about 15 percent by weight of the entire composition.

5. A composition according to claim 1 in which the liquid suspending medium is an oil-in-water-emulsion.

6. A composition according to claim 1 wherein said bottoms fraction comprises between about 50 and about 70 percent by weight of fatty acids having an acid number between about 150 and about 170.

7. An emulsion-base drilling fluid comprising a liquid suspending medium comprising between about 10 and about 90 percent of mineral oil and between about 90 and about 10 percent by weight of water, a clay-containing wall-building agent suspended in said suspending medium, and an emulsifying agent comprising the product of reaction between an alkaline compound of an alkali-metal and the undistilled bottoms fraction obtained by vacuum distilling off under vacuum of about 5 to 25 mm. at a temperature of at least about 225° F. the crude fatty acid portion of the product obtained by hydrolyzing with water a material selected from the class consisting of animal and vegetable fats and oils and mixtures thereof at elevated temperatures of about 350° F. to about 600° F. and pressures between about 150 and 1600 p.s.i. to maintain the water in a liquid state, said clay being employed in an amount representing between about 5 and about 40 percent by weight of the entire composition and said emulsifying agent being employed in an amount representing between about 0.1 and about 15 percent by weight of the entire composition.

8. A composition according to claim 7 wherein said alkaline compound of an alkali-metal is sodium hydroxide.

9. A composition according to claim 7 wherein said bottoms fraction comprises between about 50 and about 70 percent by weight of fatty acids having an acid number between about 150 and about 170.

10. A composition according to claim 7 in which the liquid suspending medium is an oil-in-water-emulsion.

References Cited in the file of this patent

UNITED STATES PATENTS

| | | |
|---|---|---|
| 2,099,825 | Rolshausen et al. | Nov. 23, 1937 |
| 2,341,134 | Adams et al. | Feb. 8, 1944 |
| 2,488,304 | Malott | Nov. 15, 1949 |
| 2,509,588 | Dawson | May 30, 1950 |
| 2,555,794 | Henkes | June 5, 1951 |
| 2,702,787 | Freeland | Feb. 22, 1955 |